United States Patent
Armour

(10) Patent No.: US 11,219,798 B2
(45) Date of Patent: Jan. 11, 2022

(54) FITNESS BASED CONTROL OF COMMUNICATIONS DEVICE

(71) Applicant: ATA IT Services LLC, New Palestine, IN (US)

(72) Inventor: Andrew Armour, New Palestine, IN (US)

(73) Assignee: ATA IT Services LLC, New Palestine, IN (US)

( * ) Notice: Subject to any disclaimer, the term of this patent is extended or adjusted under 35 U.S.C. 154(b) by 0 days.

(21) Appl. No.: 16/886,258

(22) Filed: May 28, 2020

(65) Prior Publication Data

US 2021/0316186 A1 Oct. 14, 2021

Related U.S. Application Data

(63) Continuation of application No. 15/697,793, filed on Sep. 7, 2017, now Pat. No. 10,702,744.

(60) Provisional application No. 62/384,326, filed on Sep. 7, 2016.

(51) Int. Cl.
| | | |
|---|---|---|
| H04L 29/06 | (2006.01) | |
| A63B 24/00 | (2006.01) | |
| A63B 71/06 | (2006.01) | |
| H04L 29/08 | (2006.01) | |

(52) U.S. Cl.
CPC ...... *A63B 24/0062* (2013.01); *A63B 71/0619* (2013.01); *A63B 2024/0068* (2013.01); *A63B 2220/17* (2013.01); *A63B 2220/20* (2013.01); *A63B 2220/62* (2013.01); *A63B 2230/06* (2013.01); *A63B 2230/75* (2013.01); *H04L 65/1063* (2013.01); *H04L 67/306* (2013.01)

(58) Field of Classification Search
CPC .................................................. H04L 65/1063
See application file for complete search history.

(56) References Cited

U.S. PATENT DOCUMENTS

| | | | | |
|---|---|---|---|---|
| 2012/0036245 A1* | 2/2012 | Dare | ................... | H04L 41/5041 709/223 |
| 2013/0031601 A1* | 1/2013 | Bott | ...................... | G06F 21/552 726/1 |
| 2013/0295872 A1* | 11/2013 | Guday | ................... | H04W 4/90 455/404.1 |
| 2014/0248852 A1* | 9/2014 | Raleigh | ................... | H04L 47/22 455/407 |
| 2014/0289864 A1* | 9/2014 | Dimitrakos | ........... | G06F 21/572 726/26 |
| 2015/0180894 A1* | 6/2015 | Sadovsky | ............... | H04L 67/22 726/22 |
| 2017/0279971 A1* | 9/2017 | Raleigh | ............... | H04L 63/0428 |
| 2018/0054493 A1* | 2/2018 | Heilpern | ................. | H04L 43/04 |

OTHER PUBLICATIONS

Henderson et al., "iPad in Education: A Case Study of iPad Adoption and Use in a Primary School", 2012 45th Hawaii International Conference on System Sciences, Date of Conference: Jan. 4-7, 2012.*

Bruggen et al., "Modifying smartphone user locking behavior", Proceedings of the Ninth Symposium on Usable Privacy and Security, Article No. 10 pp. 1-4, Jul. 2013.

* cited by examiner

*Primary Examiner* — Morshed Mehedi
(74) *Attorney, Agent, or Firm* — Overhauser Law Offices, LLC

(57) ABSTRACT

A method and system for limiting the amount of screentime available to a child device based on the activity of a user of the child device. A parent device is used to specify activity threshold(s) and associate them with an amount of screentime. An activity sensor provides activity data that is converted to a screentime value. An available screentime value is decremented as screentime is used on the child device. When the available screentime value reaches zero, access to functions or apps on the child device is disabled.

16 Claims, No Drawings

FITNESS BASED CONTROL OF COMMUNICATIONS DEVICE

CROSS-REFERENCE TO RELATED APPLICATIONS

This US non-provisional patent application is a continuation of and claims the benefit of and priority to U.S. non-provisional patent application Ser. No. 15/697,793 filed 7 Sep. 2017 which claims the benefit of and priority to US provisional patent application Ser. No. 62/384,326 filed 7 Sep. 2016, each entitled "Fitness Based Control of Communications Device," the entire contents of which are specifically incorporated herein by reference.

TECHNICAL FIELD

The invention generally relates to tracking physical activity, and in particular to managing an entertainment device access and features based on physical activities.

BACKGROUND

Many individuals are overweight or obese. Individuals can be employees, family members, dependents and friends. In particular, parents try to encourage exercise or physical activity in children. As computer-based technology with, for example, entertainment and social media pervade ever more aspects of individuals and especially children's' lives, exercise often takes second chair to these less healthy forms of entertainment. Some parents have tried to prevent overuse of television and gaming by creating parental locks on televisions. For instance, U.S. Pat. No. 5,231,310 discloses a parental television lock, and U.S. Pat. No. 5,060,079 discloses a parental television lock where children can unlock the television for periods of time selected by a parent via use of a programmed card that tracks the child's television usage and remaining time allotment. Others have realized that exercise and television need not be separate and competing interests. U.S. Pat. No. 6,376,936 discloses a wireless on and off switch for a television where the switch is controlled by a threshold of peddling speed on a stationary bike.

SUMMARY

Exemplary embodiments of the present invention are shown in the drawings or summarized below. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one particular aspect of the present application, a system allows a parent to limit their child's time spent on a communication or technology devices, such as a cellphone, smartphone, tablet, laptop, set top box or computer (a "child device"). This technology allows for the parent or device owner to set activity thresholds that limit the child's or end user's time spent on that device. A range of technology used by the device owner can be synchronized to manage screentime from a parent access mode. (The term screentime is referring to the amount of time allowed/spent using a technology driven device). This means that if an end user spends their free time using any of the items listed above, then each technology driven device can be managed through the mobile application technology downloaded to the technology devices.

In addition to parents, the system is equally usable by guardians or other persons. For example, a person may use the system to control a communications device of an elderly parent in a nursing home when it is desired that the parent remains physically active. In this context, the term "child" or "child device" can refer to the person or device that is controlled by another person, which is referred to herein as the "parent" or "parent device."

In another aspect of the present application, screentime may be earned by a participant through activity levels which can be tracked by various methods such as, for example, wearable technology. The more active the participant, the more access that individual accumulates. The activity information derived from the participant's wearable activity tracker provides data that can then be compared to previously configured thresholds. These thresholds can vary dependent on age, weight, height, setting, fitness experience and lifestyle. This technology allows for a participant to individually pre-select or determine to participate in fitness activities with the established thresholds which, once those thresholds have been met, can then be redeemed for screentime access.

Other embodiments of the disclosure may also be characterized as a system for locking and unlocking functions and features of user devices. The system can include an application and a set of servers with memory and a processor. The application can be for collecting and transmitting user activity data. The memory can be for storing the user activity data that describes a user activity level. The processor of a first server can be configured to convert the user activity data to a value and transmit a request to the second server based on the value. The $2^{nd}$ server can be configured to receive the request to enable a user device, user device feature, user device application, or feature of a user device application. The second server can further be configured to determine if the request can be met with the value and to fulfill the request if there is sufficient value.

Still other embodiments of the disclosure can be characterized as tangible computer readable media embodying a method of locking and unlocking user devices, features, applications, and features of applications. The method can include storing user activity data in a memory, where the user activity data describes a level of user activity. The method can also include accessing the user activity data in the memory via a processor. The method can further include converting the user activity data to a value via the processor. The method additionally can include storing the value in the memory. Furthermore, the method can include receiving a request to enable a user device, user device feature, user device application, or feature of a user device application. The method can also include determining if the request can be met with the value in the memory, via the processor. Finally, the method can include fulfilling the request if there is sufficient value.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A device management system that controls access to functions of a device based on fitness or activity levels of the present application is described. The system includes a control application which is installed on a device to be controlled. The control application includes an administrative mode. The administrative mode facilitates the installation of an MDM profile on the device, creates and modifies a participant account on an application server including the establishment of activity threshold values and limited access functions for the device, and monitors a status of the participant account. The control application can include the administrative mode on a device other than the one being controlled with the same operations, access to information and interaction with the application server.

The control application further includes a participant mode. The participant mode tracks activity data for a participant with a tracker interface. The participant mode sends activity data and requests access to the limited access functions on the device from the application server through an application server interface. Activity of a participant can be tracked with an activity tracker which is integral to the participant device, a wearable activity tracker linked to the participation device, and the like. The activity data can include data such as steps, heart rate, calories, distance, flights of stairs, consecutive minutes at heart rate, consecutive minutes of activity, and the like.

The application server maintains a participant account which can include threshold values, activity data and a list of limited access functions for a device; determines access availability to the limited access functions based on the threshold values and the activity data; and sends instructions to enable and disable the limited access functions through the MDM server. The application server may further be capable of monitoring device function access availability based on an access time frame established from the time enabling instructions are sent to the MDM server and a request to disable access to the limited access functions is received.

The mobile device manager (MDM) server provides an MDM profile for installation on the device and modifies the MDM profile based on instructions from the application server. The MDM profile controls access to the limited access functions. MDM is an industry term for the administration and management of mobile devices, such as smartphones, tablets and laptops. The intent of MDM is to optimize the functionality and security of mobile devices within an enterprise, while simultaneously protecting the corporate network. To accomplish this, MDM allows an enterprise to limit to prevent access to specified functions or programs that may be available for the mobile device.

One aspect of the invention of this application is a method for providing access management of a device based on tracked levels of activity. The method utilizes an application server and an MDM server. Each server running software. The method also utilizes a mobile control application which is run from the device on which access is to be managed.

After recognizing a participant device with the mobile control application, steps are taken to install an MDM profile on the participant device and create a participant account with the application server. These steps can be accessed when the mobile control application is in an administrative mode. The administrative mode would be accessible to an individual with the authority to manage access to functions of a device. The individual with authority can, for example, be an employer or a parent.

In a further aspect of the application, the administrative mode can be operated from a device other than the participant device. The mobile control application is installed on the admin device to provide the administrative mode. From whichever device an administrator utilizes the mobile control application, the administrator would be able to access associated participant account information and make modifications. In another aspect, the administrative mode may also provide status and activity data about a particular participant. The administrator may be capable of managing the accounts and control of multiple participant devices.

While in the administrative mode, steps are taken to create an account profile by submitting account information that can include, for example, participant information (name, age, height, weight, etc.), thresholds for earning access, how much access is earned, which functions to limit access to, and the like. In another aspect, the administrator can select pre-determined account information such as, but not limited to, activity threshold levels established for a child based on characteristics of the child including age, height, weight, gender and the like. In another example, the account profile can designate activity threshold levels that vary according to a day of the week.

Threshold examples can include (a) 3,000 steps taken=15 minutes of earned access time where for each time the participant logs 3,000 steps, the participant earns 15 minutes of access time, (2) 100 calories burned=15 minutes of earned access time where for each time the participant burns 100 calories, the participant earns 15 minutes of access time, (3) heart rate hits 100=5 minutes of access time where for each time the participant's heart rate goes above 100, the participant earns 5 minutes of access time, and the like.

Once a mobile device application is installed and while in the administrative mode, an MDM profile is installed. The MDM profile includes a set of function permissions. The function permissions of the MDM profile control access to designated functions on the participant device. To install the MDM profile, the administrator initiates a request from the mobile control application operating on the device to be managed. The application sends the request with a set of credentials to the MDM server. The MDM server authorizes the MDM profile installation request with the credentials. The MDM profile is transmitted and installed on the participant device. The installed MDM profile can then implement a set of function permissions on the device. By implementing the set of function permissions, the MDM profile controls access to a set of designated functions on the participant device.

In one aspect of the present application, the mobile control application can run in a participant mode. In the participant mode, the participant device receives activity data. The activity data can include several types of data such as but not limited to steps, heart rate, calories, distance, flights of stairs, consecutive minutes at heart rate, and consecutive minutes of activity. The activity can be tracked with hardware that is integral with the participant device or from a separate device. The separate device would be linked to the participant device to allow the activity data to be transferred between the two devices. The mobile control application can then utilize the transferred data. The separate device can be a wearable device.

The activity data is transferred from the mobile control application on the participant device to the application server. The software on the application server uses the activity data along with the account profile to create an access record. The access record will include the access time the participant has earned with the activity data.

The participant can transmit an access request from the mobile control application on the participant device to the application server. The application server determines whether the access should be granted based on the access record created with the activity data and the account profile. A set of instructions are generated in response to the whether the access record includes access time and sent to the MDM server. The MDM server sends an updated MDM profile to the participant device to modify the function permissions. Modifying the function permissions can grant access to the limited access functions on the device. The request for access process can be repeated.

In one example, the application server software determines to grant the participant access based on an access record including access time earned for activity. An enabling instruction is transmitted from the application server to the MDM server. The MDM server then transmits an update to the MDM profile on the participant device. The updated MDM profile includes function permissions that allow access to the designated functions on the participant device.

In a further aspect, the application server determines how long the participant will have access to the designated functions. The applications server tracks the time from when instructions for enabling access are sent and compares that time with the access time of the access record. When the allowed time reaches the time available in the access record a disabling instruction is transmitted to the MDM server. The MDM server then transmits another updated to the MDM profile on the device. This update includes function permissions that prevent access to the designated functions on the device.

In an alternative aspect, the participant can transmit a stop request to the application server. The application server sends disabling instruction to the MDM server to prevent access to the designated functions. The application server, tracking the usage access time, can then update the access record with a reduced amount of available time for the access record.

In one specific example, a parent downloads the Mobile Application from an online storage facility (e.g., Apple store) to their Child's device. Once the Mobile Application is downloaded, the Parent has the ability to link one or a plurality of Child devices to the Parent's account through the App. The Parent accesses the Child's account settings using an administrative mode on the Parent's device or the Child's device to set up the fitness/activity thresholds. This allows the Parent to set fitness/activity thresholds for each Child to meet or exceed before access to selected Apps is provided on the Child's device. Parents could have the option to grant or deny access to the Child's phone or device at any time regardless of earned activity time with an override functionality. Parents can also set a time frame in which each Child can and cannot earn/use screentime. For example, access is allowed only between 7 am-9 pm. The corollary being access would be denied from 9:01 pm-6:59 am.

Further in the administrative mode, the Parent would be provided with the home layout of each Child's device (the device home display screen). The Parent would go through the layout and select which Apps or functions will display all the time and which Apps or functions will disappear when the Child is denied screentime. This process allows the Parent to hide all Apps and Games that the Child is commonly using based on activity levels of the Child. This forces the Child to put down the device or phone and be more active. Once the Parent has set up the fitness/activity levels and selected Apps to display/hide, screentime and access to favorite Apps and Games are managed and earned by each Child dependent on the configured thresholds.

Another last step that may be required is the synchronization of the Child's wearable activity tracker. The wearable would be Bluetoothed to that Child's device. Bluetooth allows for the Mobile Application to pull in the fitness/activity information from the Child's wearable activity tracker automatically. Another option would to allow the Application to sync to the wearable tracker creating a connection between the wearable and the app.

The main way for a Child to earn screentime is to meet a Parent configured threshold. If the Child is not active then the Child's device will remain locked until activity thresholds have been met.

In another example, Tony is 11 years old and has run out of screentime at 5 pm on a Thursday night. The child decides to sit and watch TV for 2 hours and then gets a call from a friend. The friend wants to play a mobile app based game with him beginning at 8 pm. Since Tony decided to watch TV instead of getting up and earning more screentime through trackable activity, Tony is paying the consequences of no screentime because he decided to not be active. The only way Tony could play the game with his friend at 8pm is to work as hard as he can to meet the parent configured fitness/activity threshold. Tony can decide at 7 pm that he is going to be as active as he can before 8 pm. He recognizes that he loses access to everything on his phone at 10 pm each week night (because that was how his parents configured his access) so he needs to be extremely active if he wants to earn at least an hour of screentime to play this game with his friend.

From 7 pm-8 pm Tony does push-ups and sit-ups along with running up and down the stairs in his home. Throughout the hour Tony ended up burning 114 calories and his heart rate hit >100 5 times. With Tony's wearable activity tracker tracking this activity, the information is automatically sync'd to his device. Once the synchronization has occurred from the wearable tracker to the device, the mobile application will transmit the information to the application server where his activity is compared to the Parent configured thresholds. Since Tony's parents configured the settings to grant 30 minutes for reaching 100 calories and 5 minutes every time his heart rate broke 100, Tony ended up earning 55 minutes of screentime. The extra 14 calories that Tony burned can be saved to Tony's activity log so the next time he runs into this issue, Tony starts off with 14 calories that he has already burned instead of starting at 0.

In yet another specific example, Erika is a 21-year-old college student that downloads the mobile application. Erika as her own administrator configures fitness thresholds along with setting up a time each night to limit access for study purposes. Her personalized thresholds add 15 minutes of screentime each 5,000 steps along with 5 minutes each time she burns 100 calories. Erika needs to lose 15 pounds before her sister's wedding so she made it more difficult for herself to earn screentime. Erika loves to use Facebook®, Instagram®, Pinterest® and SnapChat® so these are the main social media applications that she has blocked herself from when her screentime has expired. Erika originally earned 30 minutes for each 5,000 steps and 15 minutes per 100 calories burned. Erika noticed that if she lowered the amount of screentime granted per threshold that she could easily lose much more weight before the wedding. To keep on track with her studies, Erika blocked each week night from 10 pm-11 pm for studying purposes. So even if Erika got side tracked during this study period and turned to her cell phone by habit, the mobile application technology would hide the selected applications from Erika's mobile device application layout view. This forces Erika to stay off her phone and study.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A fitness-based access management method comprising the steps of:
   providing a parent device, comprising a processor and software, and being operable to:
      receive installation of an app,
      store a child device identifier,
      specify an activity threshold and an associated screentime amount,
      communicate with a child device represented by the child device identifier;
   providing a child device, comprising a processor, a screen and software and being operable to:
      store an available screentime value for the child device,
      receive installation of a plurality of apps,
      communicate with the parent device,
      suppress the display apps;
   designating on the parent device apps or functions on the child device to which access may be denied;
   storing an available screentime value for the child device;
   receiving activity data from an activity sensor,
   converting the activity data to a value representing an additional amount of screentime based on the activity threshold,
   adding the value representing the additional amount of screentime to the stored available screentime value,
   decreasing the available screentime value as the screen is displayed and available screentime is being used on the child device,
   preventing the access to the designated functions or apps on the child device when the available screentime value reaches zero.

2. The fitness-based access management method of claim 1 further comprising the step of linking the activity sensor to the child device whereby the child device receives activity data from the activity sensor.

3. The fitness-based access management method of claim 2 wherein the activity sensor is wearable.

4. The fitness-based access management method of claim 1 further comprising the steps of:
   designating on the parent device time durations when the access to the designated functions or apps on the child device will be prevented;
   transmitting the designated time durations to the child device,
   preventing access on the child device to the designated functions or apps during the designated time durations regardless of the available screentime value.

5. The fitness-based access management method of claim 1 further comprising providing an MDM server and MDM profile operable to facilitate communication between the parent device and the child device.

6. The fitness-based access management method of claim 1 further comprising the step of:
   manually synchronizing the child device with the activity tracker to receive activity data.

7. The fitness-based access management method of claim 1 wherein the activity threshold is selected from the group consisting of heart rate, calories, distance, flights of stairs, consecutive minutes of activity, or consecutive minutes at heart rate.

8. The fitness-based access management method of claim 1 wherein the parent device is further operable to:
   store multiple child device identifiers; and
   permit specification of activity thresholds associated with a screentime amount for multiple child devices.

9. A fitness-based access management system comprising:
   a parent device comprising a processor and software, and being operable to:
      receive installation of an app,
      store a child device identifier,
      specify an activity threshold and an associated a screentime amount,
      designating on the parent device apps or functions on a child device to which access may be denied,
      communicate with a child device represented by the child device identifier;
   an activity sensor;
   a child device, comprising a processor, a screen and software and being operable to:
      store an available screentime value for the child device,
      receive installation of a plurality of apps,
      communicate with the parent device,
      receive activity data from the activity sensor,
      convert the activity data to a value representing an additional amount of screentime based on the activity threshold,
      add the value representing the additional amount of screentime to the stored available screentime value,
      decrease the available screentime value as the screen is displayed and available screen time is being used on the child device,
      prevent the access to the designated functions or apps on the child device when the available screentime value reaches zero.

10. The fitness-based access management system of claim 9 wherein the activity sensor is linked to the child device to thereby receive activity data from the activity sensor.

11. The fitness-based access management system of claim 10 wherein the activity sensor is wearable.

12. The fitness-based access management system of claim 9 wherein the parent device is further configured to:
   designate time durations when the access to the designated functions or apps on the child device will be prevented;
   transmit the designated time durations to the child device;

and wherein the child device is further configured to:
prevent access on the child device to the designated functions or apps during the designated time durations regardless of the available screentime value.

13. The fitness-based access management system of claim 9 further comprising an MDM server and MDM profile operable to facilitate communication between the parent device and the child device.

14. The fitness-based access management system of claim 9 wherein the child device is further configured to manually synchronize with the activity tracker to receive activity data.

15. The fitness-based access management system of claim 9 wherein the parent device is operable to permit the activity threshold to selected from the group consisting of heart rate, calories, distance, flights of stairs, consecutive minutes of activity, or consecutive minutes at heart rate.

16. The fitness-based access management method of claim 9 wherein the parent device is further operable to:
store multiple child device identifiers; and
permit specification of activity thresholds associated with a screentime amount for multiple child devices.

\* \* \* \* \*